US006216541B1

United States Patent
Carpenter

(10) Patent No.: US 6,216,541 B1
(45) Date of Patent: Apr. 17, 2001

(54) PRESSURE GAUGE OVERPRESSURE SAFETY RELEASE

(75) Inventor: David M. Carpenter, Berea, KY (US)

(73) Assignee: Dresser Industries, Inc., Dallas, TX (US)

( * ) Notice: Subject to any disclaimer, the term of this patent is extended or adjusted under 35 U.S.C. 154(b) by 403 days.

(21) Appl. No.: 08/572,183

(22) Filed: Dec. 13, 1995

(51) Int. Cl.⁷ ..................................................... G01L 7/04
(52) U.S. Cl. ................................. 73/741; 73/732; 73/738
(58) Field of Search ............................. 73/732, 738, 741

(56) References Cited

U.S. PATENT DOCUMENTS

| 0,643,876 | 2/1900 | Lane . | |
|---|---|---|---|
| 1,437,176 | 11/1922 | Harris | 73/389 |
| 1,932,159 | 10/1933 | Gruver et al. | 73/109 |
| 2,116,628 | 5/1938 | Heise | 73/109 |
| 2,186,872 | * 1/1940 | Klein | 73/741 X |
| 2,457,401 | 12/1948 | Rupley | 73/37.5 |
| 3,675,487 | 7/1972 | Mueller | 73/414 |
| 3,694,897 | * 10/1972 | Akeyoshi et al. | 29/437.1 |
| 3,857,288 | * 12/1974 | Neugebauer | 73/738 |
| 4,055,085 | 10/1977 | Wetterhorn . | |
| 4,373,398 | * 2/1983 | Ponczek | 73/738 |
| 4,695,428 | * 9/1987 | Ballentine et al. | 420/561 |
| 5,012,678 | * 5/1991 | Buchanan | 73/738 |
| 5,346,775 | * 9/1994 | Jin et al. | 428/614 |

FOREIGN PATENT DOCUMENTS

| 559907 | * 3/1974 | (CH) | 73/738 |
|---|---|---|---|
| 2321956 | * 11/1974 | (DE) | 73/738 |
| 2365428 | * 4/1975 | (DE) | 73/738 |
| 1421117 | * 1/1976 | (GB) | 73/732 |
| 2045934 | * 11/1980 | (GB) | 73/741 |

OTHER PUBLICATIONS

MIL-ST-454F, Requirement 5, "Soldering", Jun. 30, 1979.*

* cited by examiner

*Primary Examiner*—William Oen
(74) *Attorney, Agent, or Firm*—Daniel Rubin

(57) ABSTRACT

A pressure gauge in which the displacement tip of the Bourdon tube is sealed and secured to a bracket of an amplifier movement by a selected solder composition affording a failure response to an encountered overpressure at a pressure value lower than the burst pressure of the Bourdon tube. Overpressure causes a fracture in the solder to be incurred enabling release of the overpressure while a throttle plug situated in the inlet path to the Bourdon tube severely restricts continuing gas flow to the fracture site. As a consequence, released flow from the solder fracture will be at a pressure insufficient to potentially cause explosion of the gauge case/lens to occur.

5 Claims, 1 Drawing Sheet

PRESSURE GAUGE OVERPRESSURE SAFETY RELEASE

FIELD OF THE INVENTION

The field of art to which the invention pertains comprises pressure gauges affording controlled release from an encountered overpressure within the gauge.

BACKGROUND OF THE INVENTION

Pressure gauges are widely utilized in a myriad of different environments for commercial and industrial applications where measuring and indication of fluid pressure values is required. Depending on the instrument, values of pressure can be displayed in either digital or analog form. The primary sensing element of the gauge typically comprises a Bourdon tube having a free end that incurs a predictable displacement in response to pressure changes to which it is exposed. Typically, tube displacement is translated via a movement or amplifier to a rotatable pointer that is displaced opposite a dial of calibrated pressure values.

It can be appreciated that if and when an overpressure is encountered within the Bourdon tube it could, if of sufficient magnitude, cause the Bourdon tube to burst with the potential for exploding and throwing the case and/or lens. Needless to say, explosions of this type can prove hazardous, particularly to any bystander in the vicinity of the gauge.

A current standard of Underwriter's Laboratories, Inc., UL252A relates to "Compressed Gas Regulator Accessories". The standard establishes the requirement that all components of a compressed gas regulator assembly including the pressure gauge operate at a selected maximum pressure of between 30–300 psig. Each gauge, whether of 30 psi max or 300 psi max. must be capable of withstanding a pressure five times its maximum operating pressure. At or above the five times multiple, the accessory shall either retain or release the pressure without rupture or throwing of parts. Burst pressures for a Bourdon tube can typically vary from about 1100 psi for a 30 psi max. gauge to 5,000 psi for a 300 psi max. gauge.

Various approaches for compliance with the above U.L. standard have included a perforator within the tube that punctures a hole in the tube in the course of deformation. Another approach has been to utilize conventional rear venting of the case to supposedly prevent injury in the vicinity of the gauge.

While operative, none of the above have been found sufficiently practical for an inexpensive pressure gauge and despite reccognition thereof, a ready solution has not heretofore been known.

OBJECTS OF THE INVENTION

It is an object of the invention to provide a novel Bourdon tube construction that per se enables the pressure gauge to operate in compliance with the requirements of UL252A.

It is a further object of the invention to effect the previous object with an economical construction affording a controlled and localized fracture of the Bourdon tube at a preselected location while continuing gas flow to within the tube is restricted.

It is a still further object of the invention to effect the previous objects with relatively inexpensive structural features for obtaining the sought-after result of a slow release to within the cavity of the surrounding case/lens.

SUMMARY OF THE INVENTION

This invention relates to pressure gauge apparatus for indicating values of gas pressure to which the gauge is to be exposed. More specifically, the invention relates to a pressure gauge having a construction complying with the requirements of UL252A in being able to effect relief on encountering a predetermined value of overpressure without exploding or throwing of gauge parts.

For achieving the foregoing, the Bourdon tube in the pressure gauge hereof is generally constructed and secured to the gauge socket using relatively high pressure welds or solders of a strength exceeding the burst strength of the tube walls. At a selected location on the tube wall, that in a preferred embodiment comprises a connection between the crimped free end tip of the Bourdon tube to an input channel bracket of the amplifier, there is provided a specially formulated selected solder for both sealing and securing the tip to the amplifier. The solder selected is characterized by the capability to fracture at relatively low levels of pressure above the overpressure limits imposed by the U.L. standard. With the tube tip located in the channel bracket of the amplifier, the bracket prevents the solder fracture from enlarging. At the same time the fracture occurs at a pressure value significantly below the burst pressure of the tube walls so as to enable the remainder of the tube to be sustained. Operative in conjunction therewith is a throttle plug located in the socket inlet to the Bourdon tube that functions to restrict post-fracture input flow to a safe level.

By virtue of the above, tube rupture and/or an enlarged rupture at the fracture site is avoided enabling the escaping gas to flow through the fracture into the case cavity from which it is ultimately dissipated. Being that the pressure of ongoing flow is sufficiently restricted, the case/lens envelope can readily contain an overpressure spike without throwing parts and thereby avoid the potential of injury as might otherwise be associated therewith. As a consequence, a relatively simple and inexpensive solution in compliance with UL252A is achieved.

The above noted features and advantages of the invention as well as other superior aspects thereof will be further appreciated by those skilled in the art upon reading the detailed description that follows in conjunction with the drawings.

DESCRIPTION OF THE PREFERRED EMBODIMENT

Figure 1:
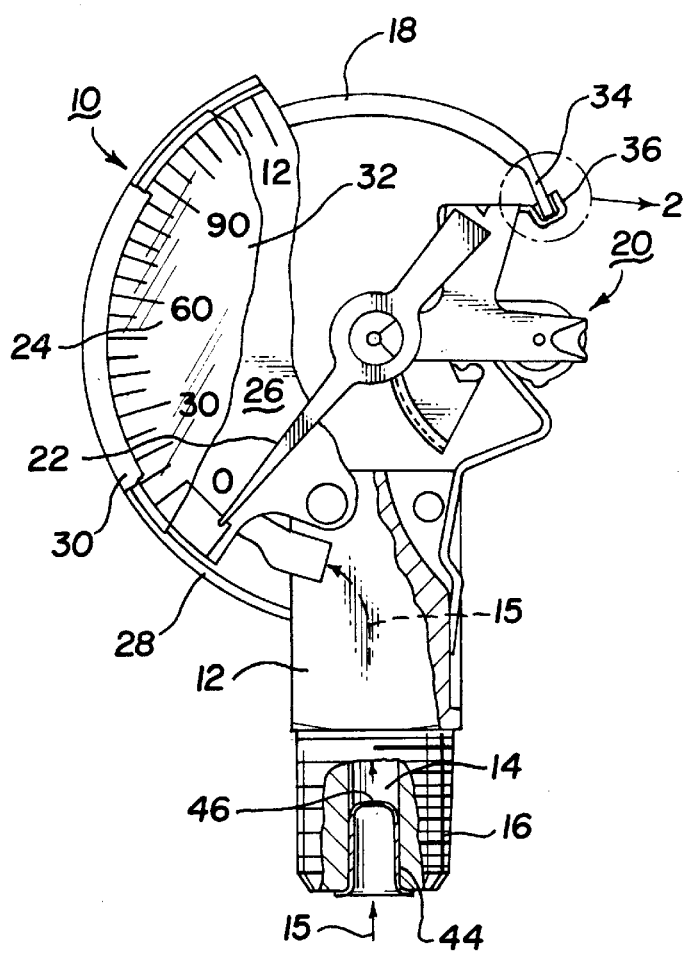
FIG. 1 is an exemplary pressure gauge partially broken away illustrating the overpressure relief features of the invention.
Figure 2:
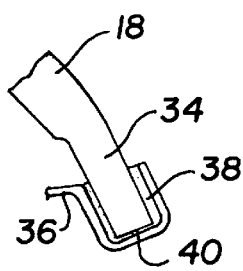
FIG. 2 is a fragmentary enlargement of the encircled portion 2 of FIG. 1.
Figure 3:
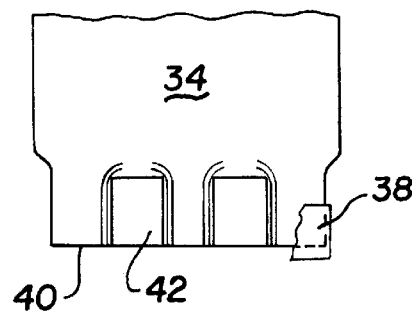
FIGS. 3, 4, and 5 are fragmentary enlargements of the tip end of the Bourdon tube in plan view, front elevation and end view respectively.
Figure 4:
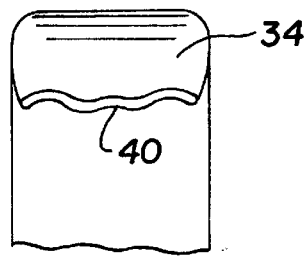
Figure 5:
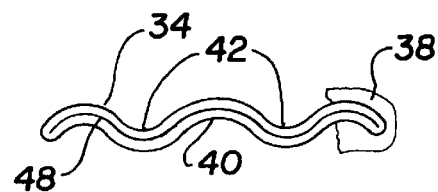

In the description which follows, like parts are marked throughout the specification and drawings with the same reference numerals respectively. The drawing figures are not necessarily to scale and in certain views, parts may have been exaggerated for purposes of clarity.

Referring now to the drawings, there is illustrated in FIG. 1 a pressure gauge designated 10 that may, for example, be of a basic type disclosed in U.S. Pat. No. 4,055,085 incorporated herein by reference.

Comprising gauge 10 is a socket 12 having an inlet 14 in which to receive gas flow 15 to be monitored and including threads 16 for connecting the gauge to a system with which it is be utilized. Gas flow 15, received at inlet 14, is communicated to Bourdon tube 18 that at free end 34 is subject to arcuate displacement in a well known manner in response to incremental pressure changes of the flow being received. With tube tip 40 connected to bracket channel 36 of amplifier 20, an amplified and correlated motion displaces pointer 22 relative to pressure values 24 on dial face 26. Except for the exposed portion of socket 12, each of the foregoing components are substantially enclosed within a gauge housing 28 having a bezel 30 securing a transparent crystal 32. The tip 40 of the Bourdon tube is commonly crimped, as illustrated by die marks 42 to substantially close the end face thereat prior to being sealed. This exposes a thin crack 48 that is sealed by solder 38 while securing the tip to U-shaped bracket 36 of the amplifier.

In accordance with the invention hereof, the solder 38 is specially selected so as to afford sufficient strength for sealing the tube end 40 in normal operation while subject to fracture at a pressure above five times the max. pressure rating of the gauge but below the burst pressure of the Bourdon tube itself. Solder strength is therefore critical in its ability to withstand an overpressure to at least five times the gauge rating but not so strong as to permit rupture of the Bourdon tube before fracture of the solder occurs. Solder fracture within channel 36 will therefore be sufficiently ductile to avoid "blow off" or bursting of the Bourdon tube. Operative concomitantly therewith is a throttle plug 44 in inlet 14 as will be described.

In a preferred embodiment, solder 38 is comprised of a soft solder alloy with a make-up percent by weight of 56.5 Sn, 3.5 Sb, 0.25 Cu and 39.75 Pb. This combination is characterized as having a tensile strength of about 7500/in and a shear strength of about 6120 lb/in. For a pressure gauge of 30 psi max., the solder joint fails at about 900–1000 psi. and actual failure is attributed to a peeling of the solder caused by Bourdon tube deformation.

Complementing the foregoing solder relation for purposes hereof is a brass throttle plug 44 permanently secured in the inlet 14 of socket 12. The plug is of a more or less bell shape configuration with a central orifice 46 on the order of about 0.007 inches in diameter. Gas flow in this arrangement passes through orifice 46 before entering Bourdon tube 18 and ensures that flow pressure received at socket 12 will continue to urge the plug inwardly of the inlet. Orifice 46, by virtue of its fine diameter, has a throttling or restrictive effect on the flow of pressurized fluid entering Bourdon tube 18. At such time as fracture of solder 38 occurs from an overpressure described supra, the throttle plug will restrict the continuing inflow of gas. It also assures that the fractured solder area will not continue to increase in size enabling the continuing input flow of gas to be vented through the fracture to safely within the case/lens without compromising envelope integrity.

By the above description there is described a novel inexpensive structure for relieving an overpressure within a pressure gauge. With an overpressure, possibly in the form of a spike, as might be imposed on the Bourdon tube, rupture of the tube is precluded. By utilizing a unique configuration of tube tip secured in the U-shaped amplifier bracket with a special formulation of solder in conjunction with an appropriately sized throttle plug in the socket inlet, excess pressure in the Bourdon tube will be relieved by fracturing or peeling of the solder at the tip without rupturing the tube or enlarging the solder opening. In this manner, the pressure is vented through a fracture crack in the solder at a rate faster than supplied past the throttle plug. The effect is to eliminate the pressure release in a volume that could potentially cause the gauge envelope to explode. By a novel structural arrangement therefore, potential danger to a passerby from an overpressure gauge failure is substantially if not completely eliminated. It should be recognized therefore that the virtues of such a structure are many, not least of which is the protection afforded to persons and properties in the vicinity of the gauge in the event a severe overpressure of the gauge should be encountered.

Since many changes could be made in the above construction and many apparently widely different embodiments of this invention could be made without departing from the scope thereof, it is intended that all matter contained in the drawings and specification shall be interpreted as illustrative and not in a limiting sense.

What is claimed is:

1. A pressure gauge operable over a predetermined operating range of pressure values affording relief to an internally encountered overpressure exceeding the max. pressure of said range comprising:

an indicator of pressure values within said range being encountered by said gauge;

an inlet adapted for connecting to a source of gas flow for which pressure values are to be indicated;

a Bourdon tube extending in a secured relation from said inlet to a free end displaceable in response to changes in pressure values received at said inlet;

an amplifier operatively secured intervening between the free end of the Bourdon tube and said indicator for translating displacement of said free end into pressure values at said indicator;

a case/lens substantially enclosing said Bourdon tube; and failure means responsive to a predetermined value of overpressure imposed on said Bourdon tube to release said overpressure at a selectively controlled rate;

said failure means including a tip on the free end of said Bourdon tube comprising a joint secured by a solder compound to the input of said amplifier and forming the site at which failure will occur for effecting said release by a fracture of said solder compound being incurred at said predetermined value of overpressure; and throttle means in the path of gas flow to said Bourdon tube to operatively restrict gas flow input to said Bourdon tube after failure has occurred.

2. A pressure gauge in accordance with claim 1 in which said solder is operatively effective within said operating pressure range to seal said joint against leakage.

3. A pressure gauge in accordance with claim 2 in which said amplifier includes an input bracket for receiving the tip of said Bourdon tube and said solder at said joint comprises said selected site.

4. A pressure gauge in accordance with claim 3 in which the tip of said Bourdon tube is crimped shut to comprise said joint, said input bracket is substantially U-shape in section, and said solder extends in a sealed relation at least between said tip and bracket surface thereat.

5. A pressure gauge in accordance with claim 2 in which said solder comprises a composition of about 56.5% Sn, 3.5% Sb, 0.25% Cu and 39.75% Pb by weight.

* * * * *